US012480330B2

(12) United States Patent
Chen et al.

(10) Patent No.: US 12,480,330 B2
(45) Date of Patent: Nov. 25, 2025

(54) DOOR LOCK OF RECREATIONAL VEHICLE WITH LOCKING TONGUE AND SAFETY PIN THAT MOVE SYNCHRONOUSLY

(71) Applicant: Dongguan Jufu Metal Manufactory Co., Ltd., Dongguan (CN)

(72) Inventors: Yuming Chen, Hongjiang (CN); Shujiang Yang, Dongguan (CN)

(73) Assignee: Dongguan Jufu Metal Manufactory Co., Ltd., Dongguan (CN)

( * ) Notice: Subject to any disclaimer, the term of this patent is extended or adjusted under 35 U.S.C. 154(b) by 0 days.

(21) Appl. No.: 19/260,541

(22) Filed: Jul. 6, 2025

(65) Prior Publication Data

US 2025/0333976 A1 Oct. 30, 2025

(30) Foreign Application Priority Data

Jan. 21, 2025 (CN) ......................... 202520139270.4

(51) Int. Cl.
*E05B 13/10* (2006.01)
*E05B 81/06* (2014.01)
*E05B 81/14* (2014.01)

(52) U.S. Cl.
CPC .............. *E05B 13/10* (2013.01); *E05B 81/06* (2013.01); *E05B 81/14* (2013.01)

(58) Field of Classification Search
CPC .......... E05B 13/10; E05B 81/06; E05B 81/14; E05B 81/30; E05B 81/34; E05B 83/36; E05B 83/34; E05B 85/22
See application file for complete search history.

(56) References Cited

U.S. PATENT DOCUMENTS 12,338,666 B1 * 6/2025 Xu .......................... E05B 81/34
2015/0279137 A1 * 10/2015 Bacon ..................... E05B 81/66 70/278.1
2024/0141707 A1 * 5/2024 Lin ......................... E05B 83/44
2024/0151071 A1 * 5/2024 Zhang ..................... E05B 81/18
2024/0328214 A1 * 10/2024 Chen ................... E05B 47/0012

* cited by examiner

*Primary Examiner* — Christine M Mills
*Assistant Examiner* — Christopher F Callahan

(57) ABSTRACT

A door lock of recreational vehicle with a locking tongue and a safety pin that move synchronously is provided, which includes a lock body and an outer handle fixedly mounted on an outer end surface of the lock body. A first sliding chamber, a second sliding chamber and a mounting chamber are formed in the lock body. A locking tongue and a spring are arranged in the first sliding chamber. A safety pin is arranged in the second sliding chamber. A lock core of the lock body is arranged on the outer handle. The lock core sequentially extends through the outer handle and an outer shell of the lock body and is located in the mounting chamber. A first rotary disk is connected to an output shaft of the lock core. The first rotary disk is sleeved with a second rotary disk driven by the first rotary disk.

8 Claims, 7 Drawing Sheets

DOOR LOCK OF RECREATIONAL VEHICLE WITH LOCKING TONGUE AND SAFETY PIN THAT MOVE SYNCHRONOUSLY

CROSS-REFERENCE TO RELATED APPLICATIONS

This application claims priority to Chinese Patent Application No. 2025201392704 filed on Jan. 21, 2025, entitled "Door Lock of Recreational Vehicle With Locking Tongue and Safety Pin that Move Synchronously", the entire content of which is incorporated herein by reference.

TECHNICAL FIELD

The present disclosure relates to the technical field of door locks of recreational vehicle, in particular to a door lock of recreational vehicle with a locking tongue and a safety pin that move synchronously.

BACKGROUND

Recreational vehicle (RV), also called caravans, can be freely parked in the beach, lake bank, grass, mountain slope and forest far away from the city. At the same time, it allows the users to have an urban lifestyle by making delicious meals by themselves, taking a hot bath, sleeping in a soft and comfortable bed, watching TV, listening to music and playing DVD. Nowadays, the RV has become a popular choice for the younger generation when traveling. The door of the RV is different from the conventional door, especially the door lock on the door.

At present, the operation mode of the door lock on the existing RV mostly involves an internal linkage mechanism used to control the ejection and retraction of a safety pin. Door handles shall be provided on the inner side and outer side of the door lock, and the locking tongue can be retracted by rotating the door handle, which means two steps are required for the overall unlocking process. That is to say, the safety pin has to be unlocked with a key firstly, and then the locking tongue is controlled to retract by rotating the door handle. In this way, the user shall operate the key and door handle one by one every time for unlocking the lock, which makes the process of unlocking the RV too cumbersome, and such a door lock is not conducive to use in the RV.

SUMMARY

In view of the deficiencies in the prior art, the present disclosure provides a door lock of recreational vehicle (RV) that has a fixed door handle and a lock hole formed on the door handle, so as to meet the requirements of synchronously moving a locking tongue and a safety pin.

To achieve the above objectives, the following technical solutions are adopted in the present disclosure.

In an embodiment, a door lock of RV with a locking tongue and a safety pin that move synchronously includes a lock body and an outer handle fixedly mounted on an outer end surface of the lock body. A first sliding chamber, a second sliding chamber and a mounting chamber are formed in the lock body. Both the first sliding chamber and the second sliding chamber are in communication with the mounting chamber. The locking tongue and a spring are arranged in the first sliding chamber. The spring abuts against the locking tongue. Under the action of the spring, the top end of the locking tongue is capable of remaining in a state of popping out outward. The safety pin is arranged in the second sliding chamber. Inner ends of the locking tongue and the safety pin are arranged in the mounting chamber and each is provided with an elongated slot. The lock body includes a lock core arranged on the outer handle. The lock core sequentially extends through the outer handle and an outer shell of the lock body and is located in the mounting chamber. A first rotary disk is connected to an output shaft of the lock core. The first rotary disk is sleeved with a second rotary disk driven by the first rotary disk. A first eccentric rod is disposed on the first rotary disk. The first eccentric rod is arranged in the elongated slot of the locking tongue, and is configured to push the locking tongue outwardly or pull the locking tongue inwardly through the rotation of the first rotary disk. A side edge of the second rotary disk is provided with a gear face and a limiting protrusion. A limiting block is arranged in the mounting chamber in a movement track of the limiting protrusion. A toggle gear is mounted in the mounting chamber. The toggle gear meshes with the gear face of the second rotary disk. A second eccentric rod is disposed on the toggle gear. The second eccentric rod is arranged in the elongated slot of the safety pin.

Preferably, the limiting block is rotatably connected in the mounting chamber, and a limiting cavity is formed in the mounting chamber at a position of the limiting block, so that the limiting block is only allowed to rotate within a specific range. A side edge of the second rotary disk adjacent to the limiting protrusion is provided with an abutting surface, and an edge of the abutting surface touches a side end of the limiting block.

Preferably, both ends of the abutting surface of the second rotary disk and the side end of the limiting block are all configured as smooth surfaces.

Preferably, two convex portions are symmetrically disposed on a side wall of the first rotary disk. The second rotary disk is provided with a sleeving aperture and two 90-degree grooves spaced apart and in communication with the sleeving aperture, and the convex portions are respectively disposed in the 90-degree grooves.

Preferably, a coaxial gear is mounted in the mounting chamber. The coaxial gear meshes with the gear face of the second rotary disk. A rotation knob is disposed on the inner end surface of the lock body. A rotation shaft of the rotation knob is disposed in the mounting chamber and provided with a linkage gear. The linkage gear is connected to the coaxial gear.

Preferably, a first reduction motor is arranged in the mounting chamber. The output shaft of the first reduction motor is connected with the coaxial gear as a whole.

Preferably, a third sliding chamber and a second reduction motor are arranged in the lock body. A sliding bar is arranged in the third sliding chamber. One end of the sliding bar is bent to form a lapping end. The other end of the sliding bar is provided with a guide block. A guide hole is formed in the third sliding chamber at a position of the guide block. The guide block is arranged in the guide hole. The sliding bar is provided with a rack face. The second reduction motor meshes with the rack face through a gear set. The locking tongue includes a lapping edge. The lapping end is located at a position corresponding to the lapping edge, and configured to drag the locking tongue to retract as the sliding bar moves.

Preferably, a tactile switch is disposed at one end of the guide hole.

Preferably, an inner end surface of the lock body is hinged with an inner handle. The inner handle is provided with an insertion rod, the locking tongue is provided with an insertion opening, and the insertion rod is inserted in the insertion opening.

In accordance with the above technical solutions disclosed, in the present disclosure, the lock core is directly arranged on the outer handle, so that the lock core does not need to occupy extra space, which can facilitate the fine design of the lock body. Meanwhile, the first rotary disc, the second rotary disc and the toggle gear form a linkage mechanism, so that the locking tongue and the safety pin can retract synchronously during the unlocking process, which does not require the outer handle to rotate. In addition, under the action of a first reduction motor and a second reduction motor, the locking tongue and the safety pin can be unlocked in various forms, thus meeting the extra needs of intelligent unlocking.

DETAILED DESCRIPTION

In order to make the objectives, technical solutions, and advantages of the present disclosure clearer and better understood, the present disclosure is described further in detail below combining with the accompanying drawings and embodiments. It should be understood that specific embodiments described herein are only intended to explain the disclosure but not intended to limit the disclosure.

In the description of the present disclosure, it is to be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", etc. indicate the orientations or positional relationships on the basis of the drawings. These terms are only intended for facilitating illustrating the present disclosure and simplifying the illustration, rather than indicating or implying that the devices or elements referred thereto have to present particular orientations, and be constructed and operated in particular orientations, and therefore cannot be construed as limiting the present disclosure. In addition, the terms "first" and "second" are only intended for illustrative purposes, rather than being construed as indicating or implying relative importance or implicitly designating the number of the technical features as indicated. Thus, the features modified by "first" and "second" may explicitly or implicitly include one or more said feature. In the description of the present disclosure, the term "a plurality of" means two or more than two, unless otherwise explicitly and specifically defined.

In the description of the present disclosure, it is to be understood that unless otherwise expressly specified and defined, the terms "mounted to", "connected with" and "connected to" should be understood in a broad sense, for example, fixedly connected, detachably connected, or integrally connected; mechanically connected or electrically connected; directly connected or indirectly connected through an intermediate medium; or in an interior communication or an interaction relationship between two elements. For those of ordinary skill in the art, the specific meanings of the above-described terms in the present disclosure may be understood according to specific circumstances.

Figure 1:
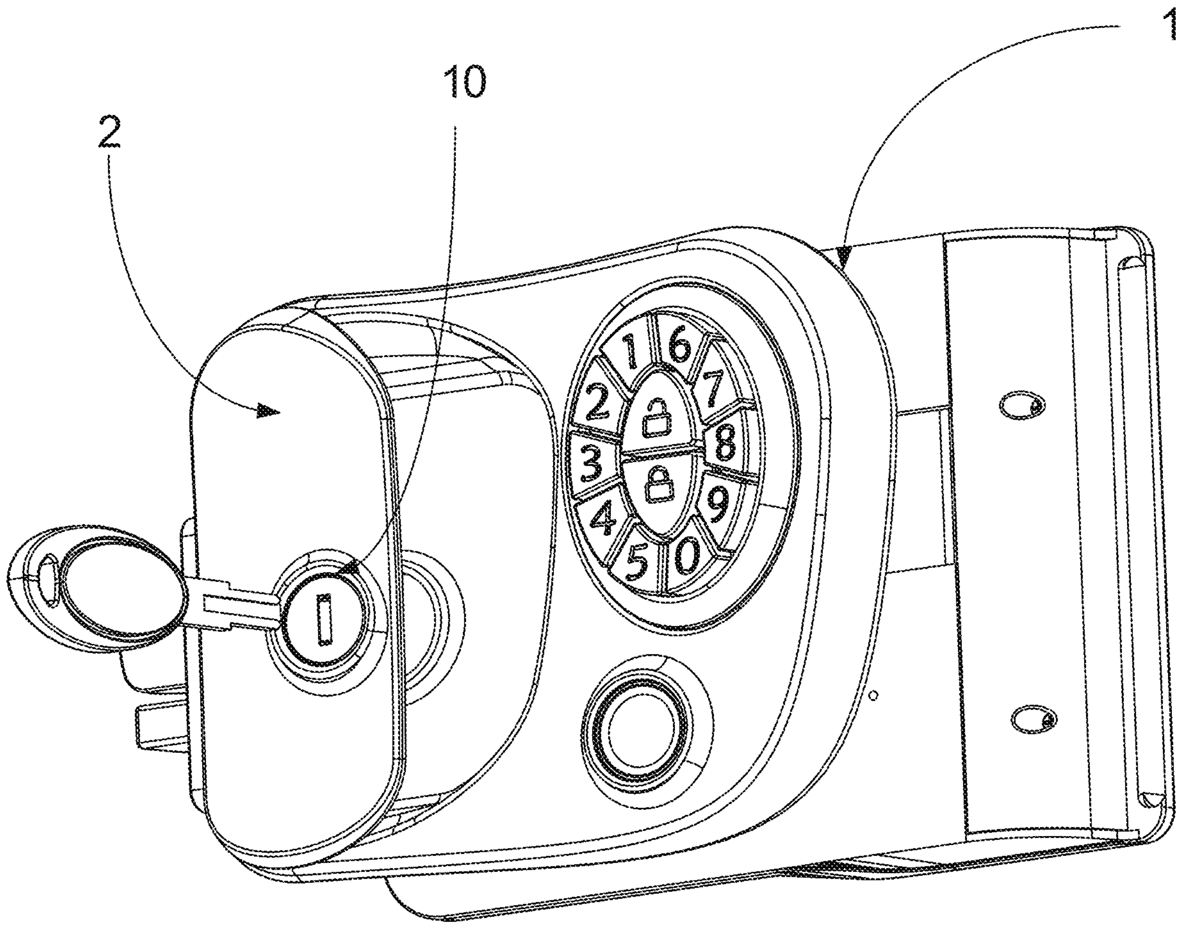
FIG. 1 is a schematic structural diagram of a door lock of recreational vehicle according to an embodiment of the present disclosure.
Figure 2:
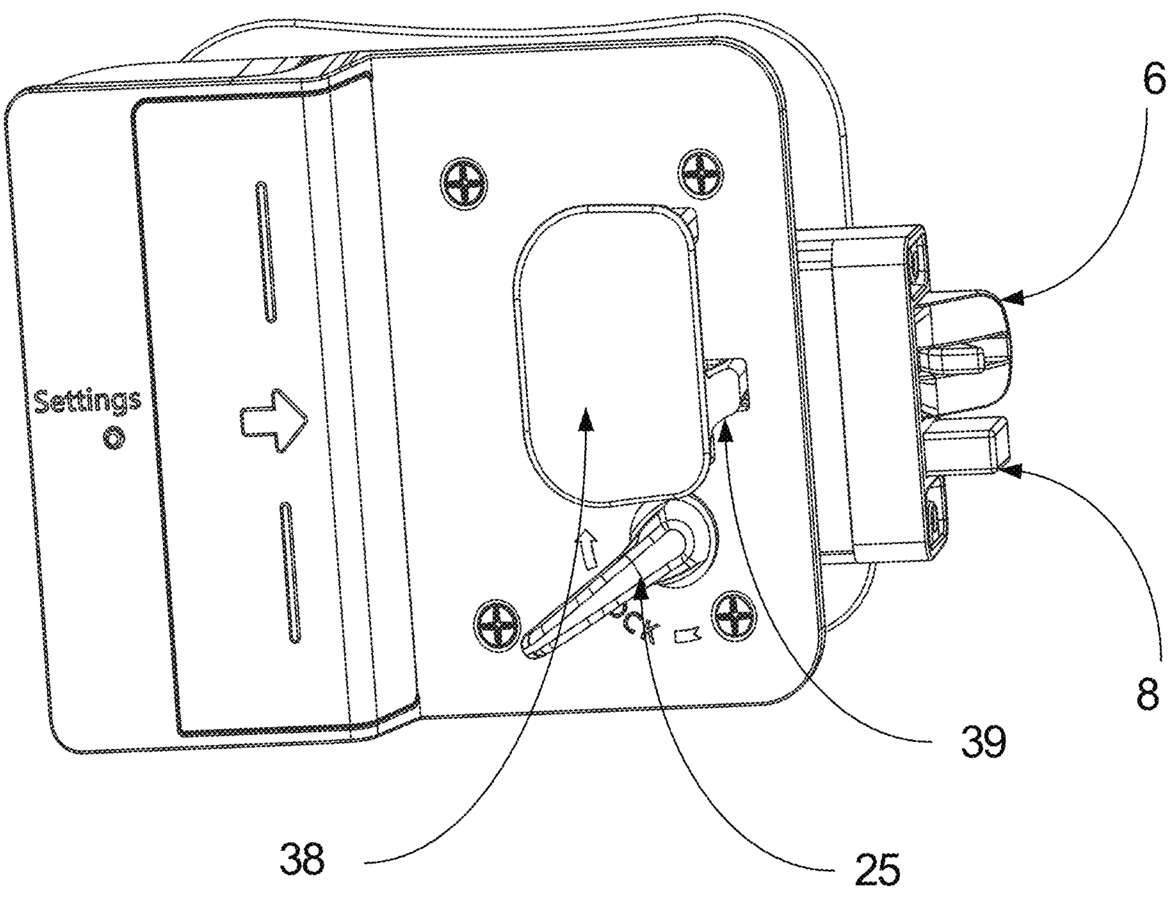
FIG. 2 is similar to FIG. 1, but viewed from a back of the door lock of recreational vehicle.
Figure 3:
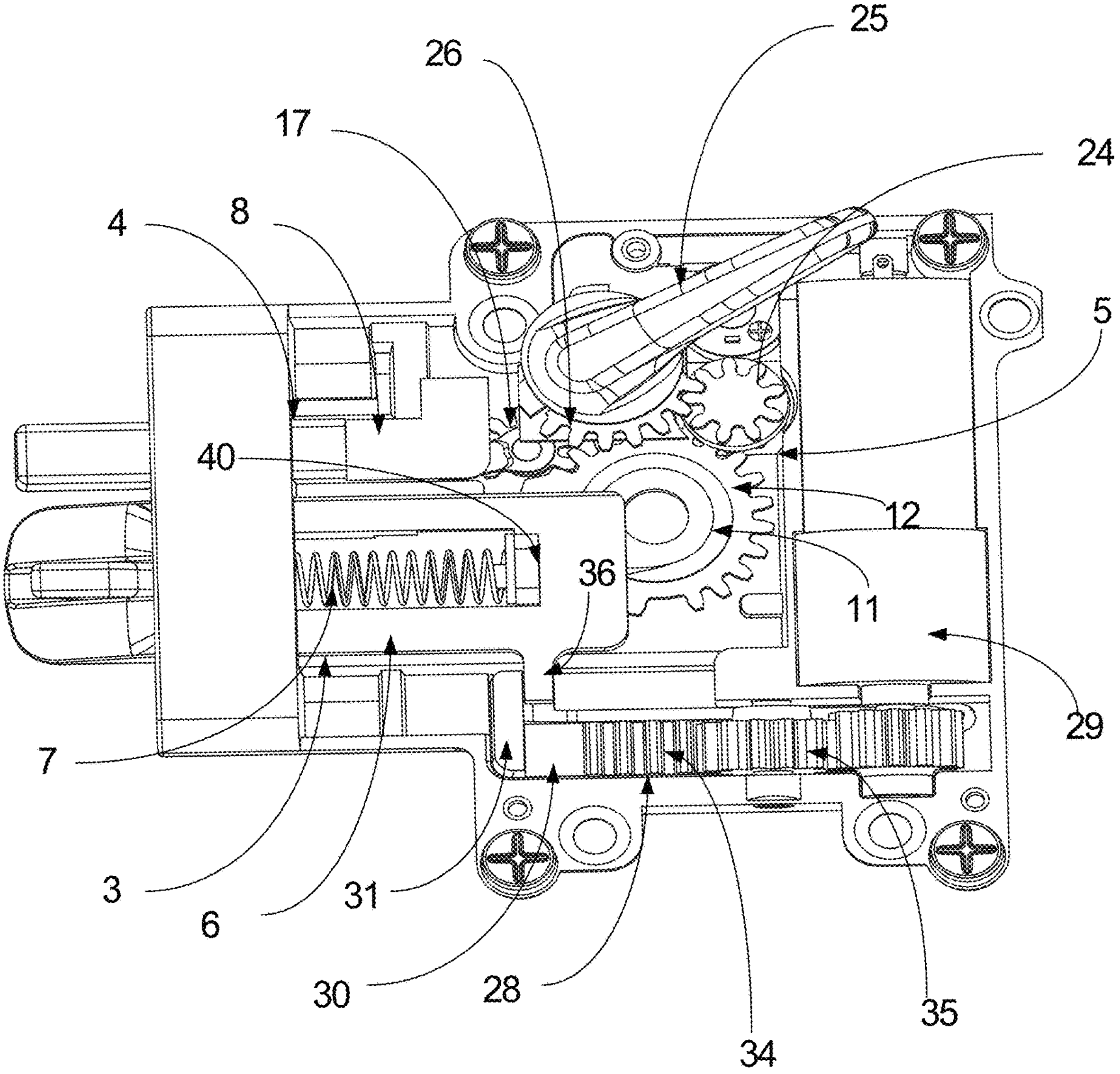
FIG. 3 is a schematic structural diagram of an interior of the door lock of recreational vehicle according to an embodiment of the present disclosure.
Figure 4:
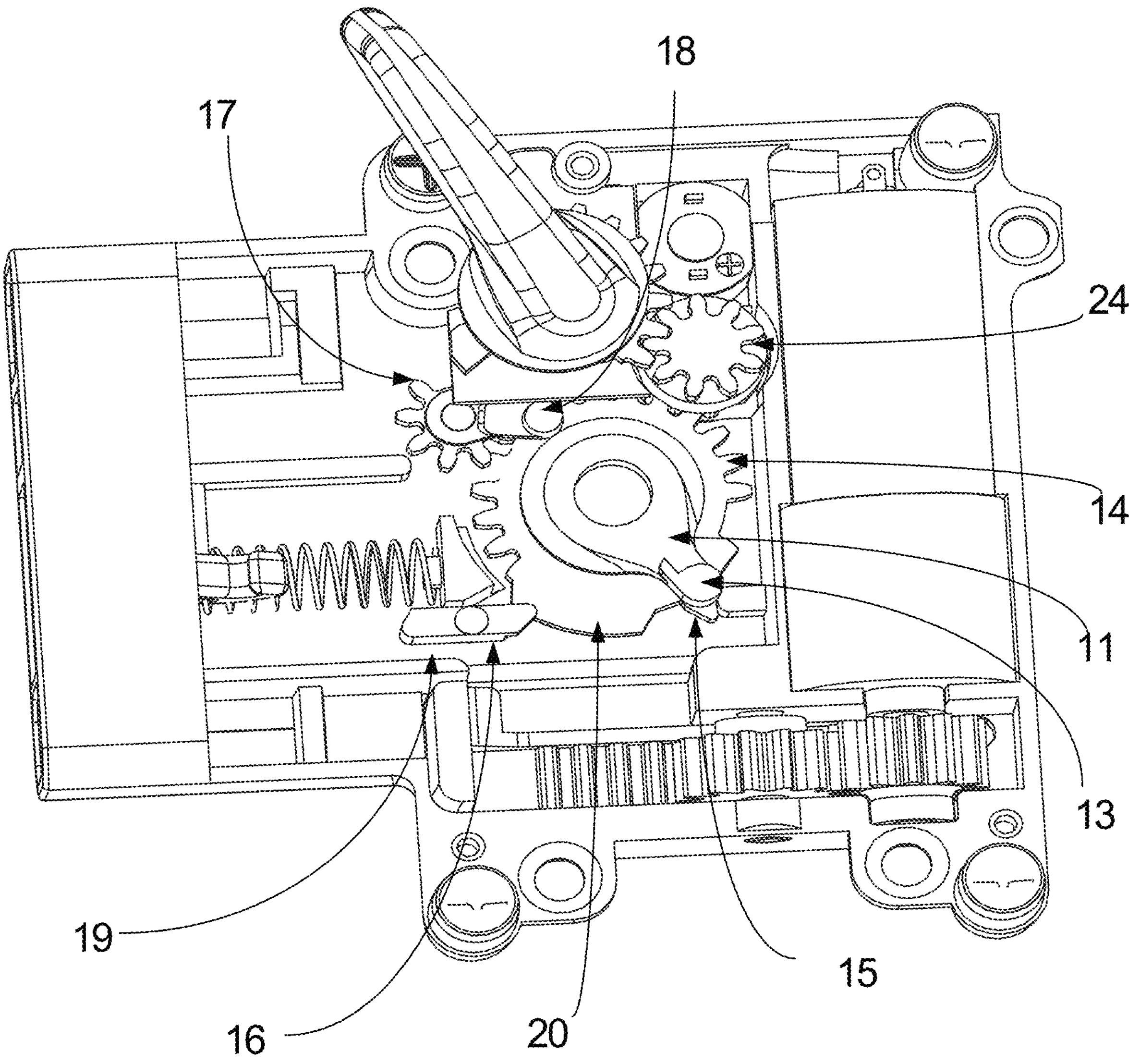
FIG. 4 is similar to FIG. 3, but with a locking tongue and a safety pin omitted.
Figure 5:
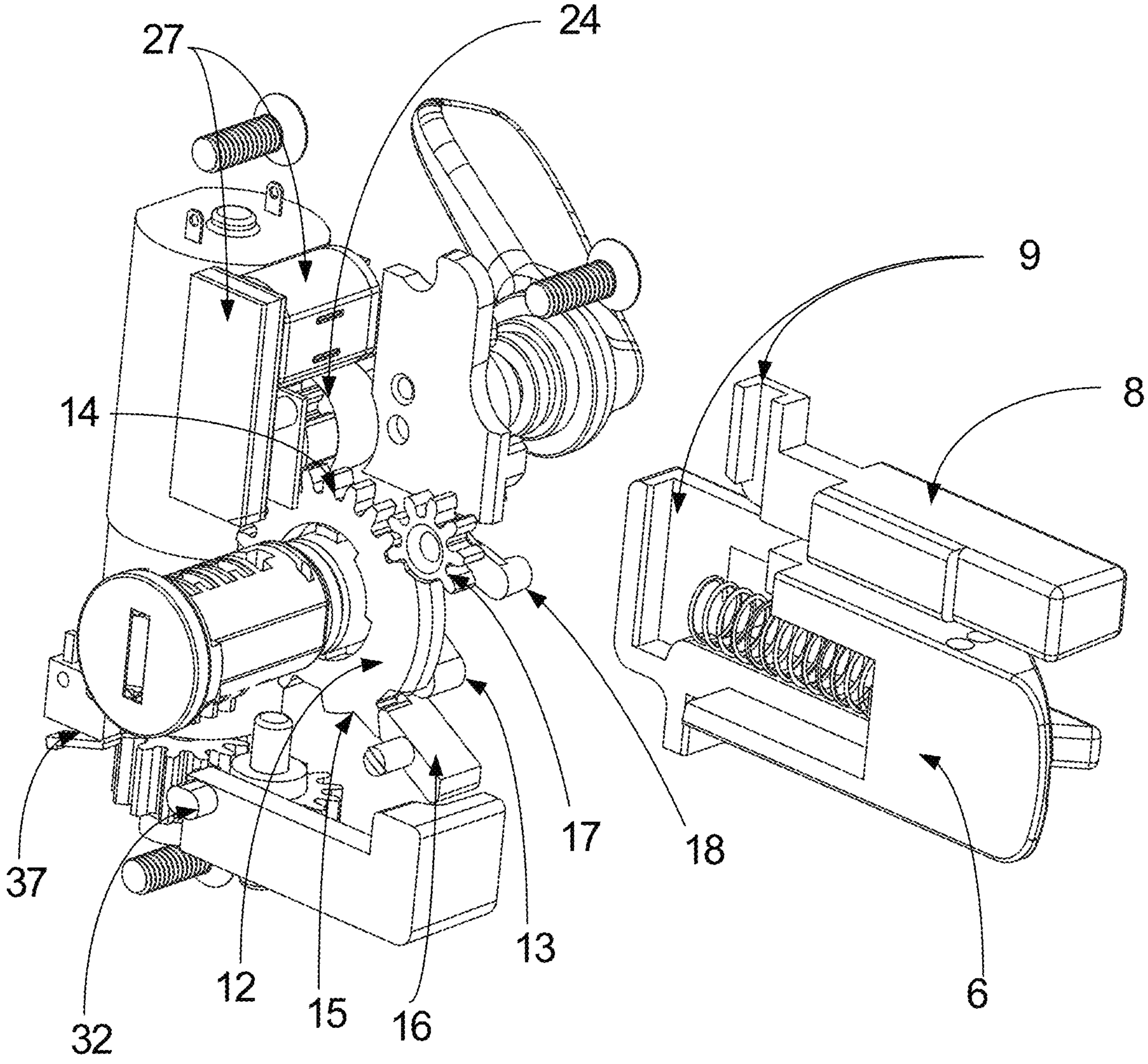
FIG. 5 is an exploded view of an interior structure of the door lock of recreational vehicle.
Figure 6:
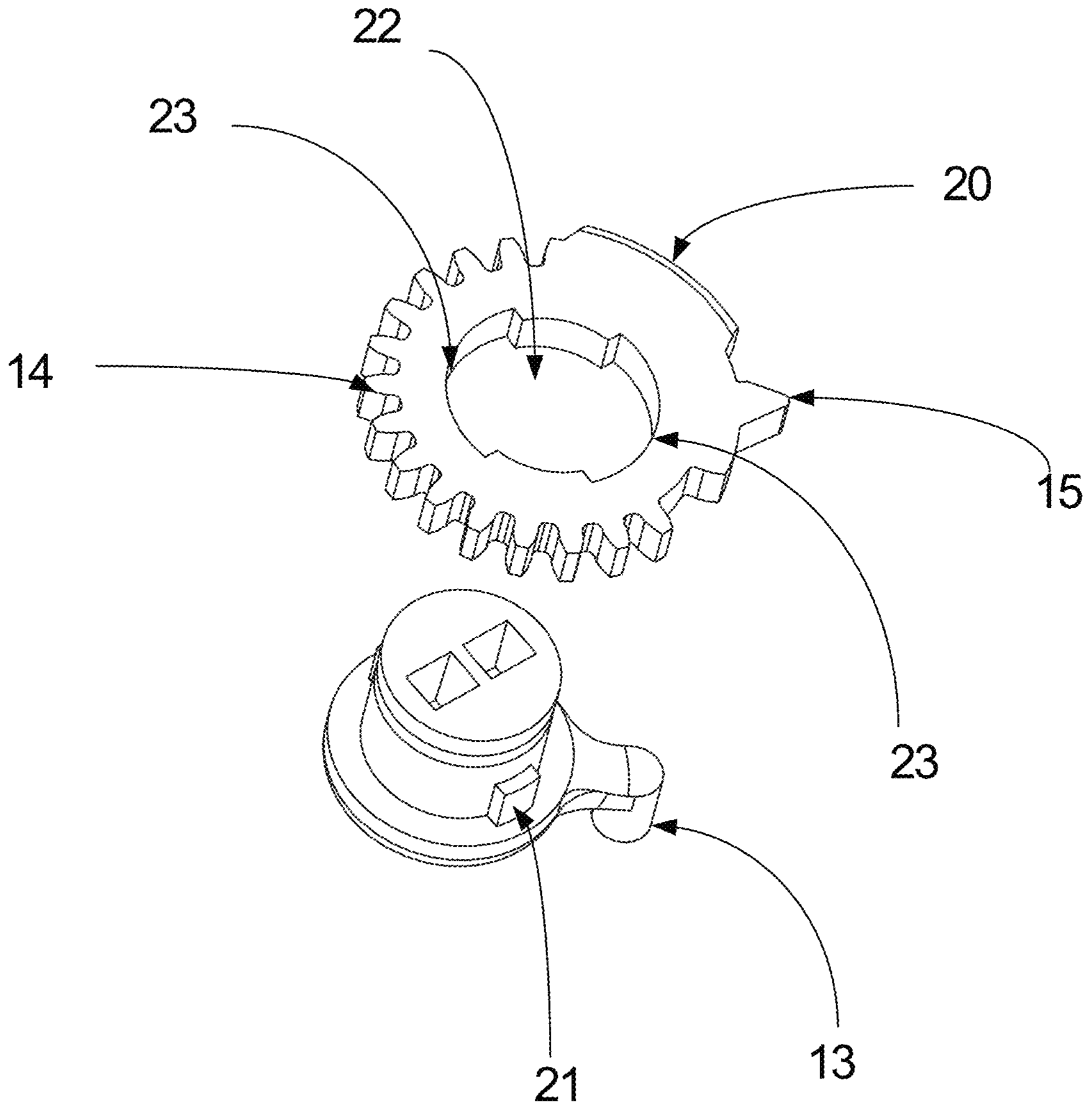
FIG. 6 is a schematic structural diagram of a first rotary disk and a second rotary disk according to an embodiment of the present disclosure.
Figure 7:
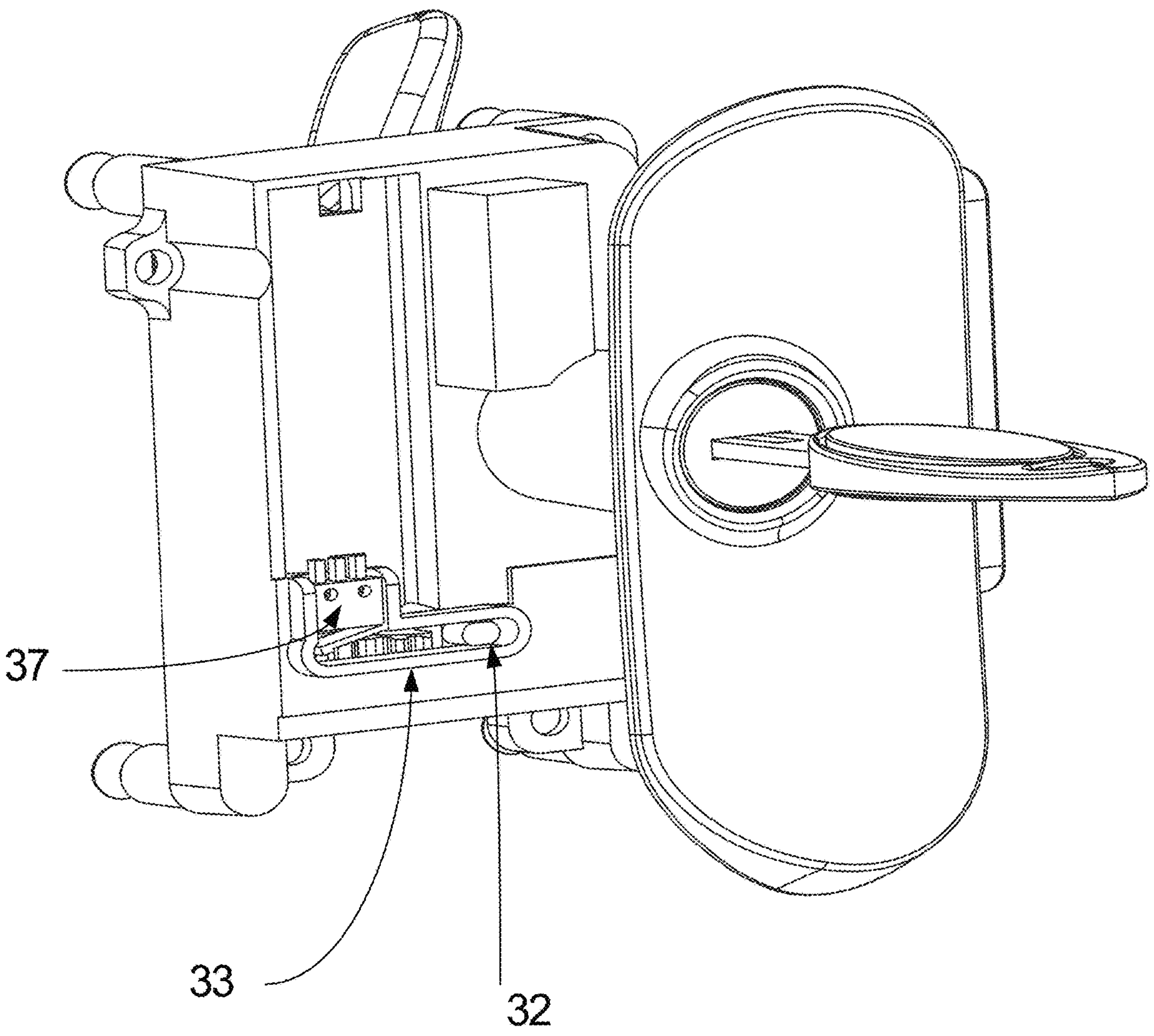
FIG. 7 is a schematic diagram of a structure at a guide hole according to an embodiment of the present disclosure.

As shown in FIGS. 1 to 7, a door lock of recreational vehicle (RV) with a locking tongue and a safety pin that move synchronously is provided in this embodiment. The door lock of RV includes a lock body 1 and an outer handle 2 fixedly mounted on an outer end surface of the lock body 1. A first sliding chamber 3, a second sliding chamber 4 and a mounting chamber 5 are formed in the lock body 1. Both the first sliding chamber 3 and the second sliding chamber 4 are in communication with the mounting chamber 5. A locking tongue 6 and a spring 7 are arranged in the first sliding chamber 3. The spring 7 abuts against the locking tongue 6. Under the action of the spring 7, the top end of the locking tongue 6 can remain in a state of popping out outward. A safety pin 8 is arranged in the second sliding chamber 4. Inner ends of the locking tongue 6 and the safety pin 8 are arranged in the mounting chamber 5 and each is provided with an elongated slot 9. The lock body 1 includes a lock core 10 arranged on the outer handle 2. The lock core 10 sequentially extends through the outer handle 2 and an outer shell of the lock body 1 and is located in the mounting chamber 5. A first rotary disk 11 is connected to an output shaft of the lock core 10. The first rotary disk 11 is sleeved with a second rotary disk 12 driven by the first rotary disk 11. A first eccentric rod 13 is disposed on the first rotary disk 11. The first eccentric rod 13 is arranged in the elongated slot 9 of the locking tongue 6, and is configured to push the locking tongue 6 outwardly or pull the locking tongue 6 inwardly through the rotation of the first rotary disk 11. A side edge of the second rotary disk 12 is provided with a gear face 14 and a limiting protrusion 15. A limiting block 16 is arranged in the mounting chamber 5 in a movement track of the limiting protrusion 15. A toggle gear 17 is mounted in the mounting chamber 5. The toggle gear 17 meshes with the gear face 14 of the second rotary disk 12. A second eccentric rod 18 is disposed on the toggle gear 17. The second eccentric rod 18 is arranged in the elongated slot 9 of the safety pin 8.

In the present embodiment, the lock core 10 is directly arranged on the outer handle 2, so that the lock core 10 does not need to occupy extra space, which can facilitate the fine design of the lock body. Meanwhile, the first rotary disc 11, the second rotary disc 12 and the toggle gear 17 form a linkage mechanism, so that the locking tongue 6 and the safety pin 8 can retract synchronously during the unlocking process, which does not require the outer handle 2 to rotate.

During specific operation, when being unlocked by a key, the lock core 10 rotates, thereby causing the first rotary disk 11 to rotate. When the first rotary disk 11 rotates, the second rotary disk 12 is driven to rotate together. When the first rotary disk 11 rotates, the first eccentric rod 13 disposed on the first rotary disk 11 moves to be engaged with the elongated slot 9 on the locking tongue 6, so that the locking tongue 6 is pulled inwardly, thereby completing retraction of the locking tongue 6. When the second rotary disk 12 rotates, the gear face 14 drives the toggle gear 17 to rotate. Then, the second eccentric rod 18 moves to be engaged with the elongated slot 9 on the safety pin 8, so that the safety pin 8 is pulled inwardly, thereby completing retraction of the locking tongue 8 and the whole unlocking process. In the locking process, the second rotary disk 12 rotates reversely. In this case, the locking tongue 6 can automatically pop out under the action of the spring 7, thereby completing the whole locking process.

Further, both the first eccentric rod 13 and the second eccentric rod 18 have a fixed moving range in order to avoid excessive rotation. Therefore, to prevent a rotation angle from exceeding a set range, the limiting block 16 is provided and configured to limit the rotation angle. In order to better effectively limit the rotation angle in the rotation process, and avoid obstruction during normal rotation, the limiting block 16 of the present embodiment is rotatably connected in the mounting chamber 5, and a limiting cavity 19 is formed in the mounting chamber 5 at a position of the limiting block 16, so that the limiting block 16 is only allowed to rotate within a specific range. A side edge of the second rotary disk 12 adjacent to the limiting protrusion 15 is provided with an abutting surface 20, and an edge of the abutting surface 20 touches a side end of the limiting block 16, so that in the normal rotation, the abutting surface 20 is in contact with, but not abutted against, a side surface of the limiting block 16. Thus, the rotation of the second rotary disk 12 can be ensured to be stable, and the limiting block 16 can be rotated reversely when the rotation of second rotary disk 12 is reversed, so that the abutting surface 20 still touches the side surface of the limiting block 16 again. The limiting effect can be achieved by the interlocking of the limiting block 16 and the limiting protrusion 15.

Further, in order to avoid jamming, both ends of the abutting surface 20 of the second rotary disk 12 and the side end of the limiting block 16 in an embodiment are all configured as smooth surfaces.

Further, in an embodiment, when moving the lock core 10 in the locking process or the unlocking process, in order to avoid synchronous reverse rotation of the second rotary disk 12 when the locking tongue 6 rebounds, a clutch structure is provided. In the present embodiment, two convex portions 21 are symmetrically disposed on a side wall of the first rotary disk 11. The second rotary disk 12 is provided with a sleeving aperture 22 and two 90-degree grooves 23 spaced apart and in communication with the sleeving aperture 22. The convex portions 21 are respectively disposed in the 90-degree grooves 23. Thus, a rotation range can be segregated due to the range of the 90-degree grooves 23, so as to avoid synchronous rotation when necessary.

Further, in an embodiment, in order to perform the retraction operation of the safety pin 8 inside the RV, a coaxial gear 24 is mounted in the mounting chamber 5. The coaxial gear 24 meshes with the gear face 14 of the second rotary disk 12. A rotation knob 25 is disposed on the inner end surface of the lock body 1. A rotation shaft of the rotation knob 25 is disposed in the mounting chamber 5 and is provided with a linkage gear 26. The linkage gear 26 is connected to the coaxial gear 24. In this way, the user can rotate the rotation knob 25 to drive internal components to move correspondingly, and then drive the second rotary disc 12 and the toggle gear 17 to retract the safety pin 8.

Further, in order to meet the requirements of intelligent quick locking and regular locking, a first reduction motor 27 is arranged in the mounting chamber 5 of an embodiment. The output shaft of the first reduction motor 27 is connected with the coaxial gear 24 as a whole. Meanwhile, a third sliding chamber 28 and a second reduction motor 29 are further arranged in the lock body 1. A sliding bar 30 is arranged in the third sliding chamber 28. One end of the sliding bar 30 is bent to form a lapping end 31. The other end of the sliding bar 30 is provided with a guide block 32. A guide hole 33 is formed in the third sliding chamber 28 at a position of the guide block 32. The guide block 32 is arranged in the guide hole 33. The sliding bar 30 is provided with a rack face 34. The second reduction motor 29 meshes with the rack face 34 through a gear set 35. The locking tongue 6 includes a lapping edge 36. The lapping end 31 is located at a position corresponding to the lapping edge 36, and configured to drag the locking tongue 6 to retract as the sliding bar 30 moves. A tactile switch 37 is disposed at one end of the guide hole 33. In this way, under the action of the first reduction motor 27 and the second reduction motor 29, the movement of the safety pin 8 and the locking tongue 6 can be driven respectively, which can be adapted for the application of other intelligent unlocking such as fingerprint unlocking, password unlocking and APP unlocking.

Further, in order to meet the requirement of quick unlocking inside the RV, the inner end surface of the lock body 1 of an embodiment is hinged with an inner handle 38, the inner handle 38 is provided with an insertion rod 39, and the locking tongue 6 is provided with an insertion opening 40. The insertion rod 39 is inserted in the insertion opening 40, so that the locking tongue 6 can be directly retracted by pulling the inner handle 38 inside the RV.

The above are only preferred embodiments of the present disclosure, and do not limit the scope of the present disclosure. Any equivalent structure or equivalent process transformation made in view the content of the specification and drawings of the present disclosure, or directly or indirectly applied in other related technical fields, are also included in the scope of protection of the present disclosure.

What is claimed is:

1. A door lock of recreational vehicle with a locking tongue and a safety pin that move synchronously, comprising a lock body and an outer handle fixedly mounted on an outer end surface of the lock body, wherein a first sliding chamber, a second sliding chamber and a mounting chamber are formed in the lock body;

both the first sliding chamber and the second sliding chamber are in communication with the mounting chamber;

the locking tongue and a spring are arranged in the first sliding chamber;

the spring abuts against the locking tongue, and under an action of the spring, a top end of the locking tongue is capable of remaining in a state of popping out outward;

the safety pin is arranged in the second sliding chamber;

inner ends of the locking tongue and the safety pin are arranged in the mounting chamber and each is provided with an elongated slot;

the lock body comprises a lock core arranged on the outer handle, and the lock core sequentially extends through the outer handle and an outer shell of the lock body and is located in the mounting chamber;

a first rotary disk is connected to an output shaft of the lock core, and the first rotary disk is sleeved with a second rotary disk driven by the first rotary disk;

a first eccentric rod is disposed on the first rotary disk, and the first eccentric rod is arranged in the elongated slot of the locking tongue, and is configured to push the locking tongue outwardly or pull the locking tongue inwardly through a rotation of the first rotary disk;

a side edge of the second rotary disk is provided with a gear face and a limiting protrusion;

a limiting block is arranged in the mounting chamber in a movement track of the limiting protrusion;

a toggle gear is mounted in the mounting chamber, the toggle gear meshes with the gear face of the second rotary disk, and a second eccentric rod is disposed on the toggle gear; and the second eccentric rod is arranged in the elongated slot of the safety pin.

2. The door lock of recreational vehicle of claim 1, wherein the limiting block is rotatably connected in the mounting chamber;

a limiting cavity is formed in the mounting chamber at a position of the limiting block, so that the limiting block is only allowed to rotate within a specific range; and a side edge of the second rotary disk adjacent to the limiting protrusion is provided with an abutting surface, and an edge of the abutting surface touches a side end of the limiting block.

3. The door lock of recreational vehicle of claim 2, wherein both ends of the abutting surface of the second rotary disk and the side end of the limiting block are all configured as smooth surfaces.

4. The door lock of recreational vehicle of claim 3, wherein two convex portions are symmetrically disposed on a side wall of the first rotary disk, the second rotary disk is provided with a sleeving aperture and two 90-degree grooves spaced apart and in communication with the sleeving aperture, and the convex portions are respectively disposed in the 90-degree grooves.

5. The door lock of recreational vehicle of claim 4, wherein a coaxial gear is mounted in the mounting chamber, and the coaxial gear meshes with the gear face of the second rotary disk; a rotation knob is disposed on an inner end surface of the lock body, a rotation shaft of the rotation knob is disposed in the mounting chamber and provided with a linkage gear, and the linkage gear is connected to the coaxial gear.

6. The door lock of recreational vehicle of claim 5, wherein a first reduction motor is arranged in the mounting chamber, and an output shaft of the first reduction motor is connected with the coaxial gear as a whole;

a third sliding chamber and a second reduction motor are arranged in the lock body, and a sliding bar is arranged in the third sliding chamber, with an end of the sliding bar being bent to form a lapping end, and another end of the sliding bar being provided with a guide block;

a guide hole is formed in the third sliding chamber at a position of the guide block, and the guide block is arranged in the guide hole;

the sliding bar is provided with a rack face, and the second reduction motor meshes with the rack face through a gear set; and the locking tongue comprises a lapping edge, and the lapping end is located at a position corresponding to the lapping edge and configured to drag the locking tongue to retract as the sliding bar moves.

7. The door lock of recreational vehicle of claim 6, wherein a tactile switch is disposed at an end of the guide hole.

8. The door lock of recreational vehicle of claim 1, wherein an inner end surface of the lock body is hinged with an inner handle, and the inner handle is provided with an insertion rod; and the locking tongue is provided with an insertion opening, and the insertion rod is inserted in the insertion opening.

* * * * *